United States Patent [19]
Taguchi

[11] 3,832,984
[45] Sept. 3, 1974

[54] INTAKE AND EXHAUST MANIFOLD DEVICE OF AN INTERNAL COMBUSTION ENGINE
[75] Inventor: Fiji Taguchi, Tokyo, Japan
[73] Assignee: Honda Giken Kogyo Kabushiki Kaisha, Tokyo, Japan
[22] Filed: June 22, 1973
[21] Appl. No.: 372,765

[30] Foreign Application Priority Data
June 28, 1972 Japan.............................. 47-64669

[52] U.S. Cl.... 123/122 AB, 123/32 SPA, 123/75 B, 123/122 AC
[51] Int. Cl....................... F02m 31/00, F02b 75/02
[58] Field of Search... 123/32 ST, 32 SPA, 122 AC, 123/141, 122 A, 75 B, 122 AB, 52 M

[56] References Cited
UNITED STATES PATENTS
1,437,395  12/1922  Brush............................ 123/122 AC
2,244,214  6/1941   Pescara.......................... 123/75 B
2,936,746  5/1960   Rundquist....................... 123/122 A
3,659,564  5/1972   Suzuki............................ 123/32 ST Primary Examiner—Laurence M. Goodridge
Assistant Examiner—Ronald B. Cox
Attorney, Agent, or Firm—Lyon & Lyon

[57] ABSTRACT

A manifold arrangement for a reciprocating, internal combustion engine of the type having an auxiliary combustion chamber associated with each main combustion chamber. The manifold arrangement includes one system for delivering a rich air-fuel mixture to each auxiliary combustion chamber, a second system for conducting a lean air-fuel mixture to each main combustion chamber and a third system for exhausting each main combustion chamber. The intake system associated with each auxiliary combustion chamber is in thermal communication with the exhaust manifold system for rapid heating of the rich air-fuel mixture. The intake associated with each main combustion chamber is in thermal communication with the coolant system of the engine for insuring good vaporization of the incoming mixture.

2 Claims, 1 Drawing Figure

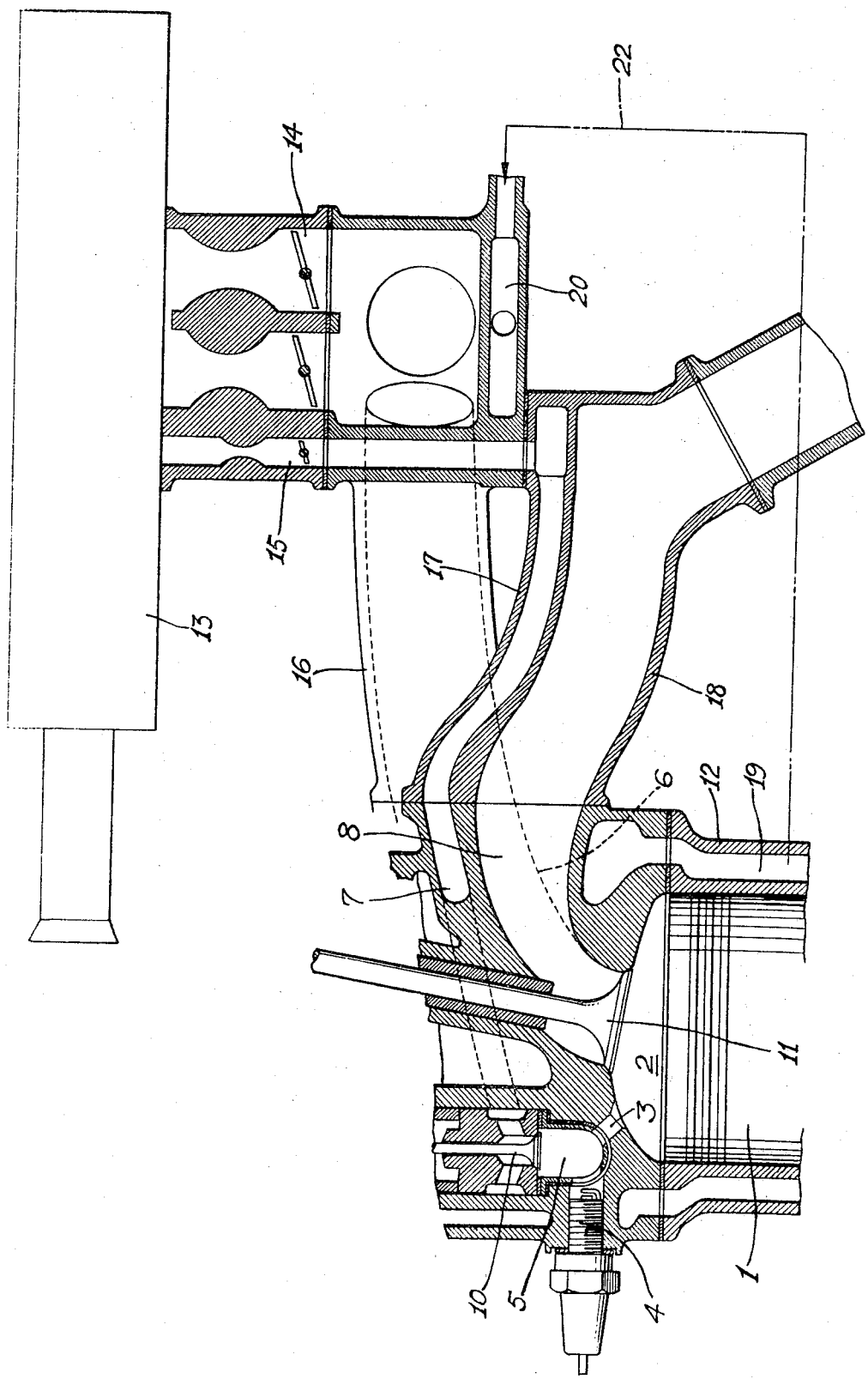

INTAKE AND EXHAUST MANIFOLD DEVICE OF AN INTERNAL COMBUSTION ENGINE

This invention relates to internal combustion engines having an auxiliary combustion chamber associated with each main combustion chamber. More particularly, this invention is directed to an improved manifold system whereby exhaust heat and engine heat are advantageously employed for preconditioning the incoming air-fuel mixture.

Internal combustion engines of the type having an auxiliary combustion chamber associated with each main combustion chamber have been recognized for their ability to provide improved fuel economy and a relatively low level of emission pollutants when compared with other forms of internal combustion engines. These engines deliver a rich air-fuel mixture to each auxiliary combustion chamber and a lean air-fuel mixture to each main combustion chamber. The rich mixture is ignited and then passes through a passageway or torch nozzle into the main combustion chamber where it ignites the lean air-fuel mixture. The burned mixture is then exhausted from the engine in preparation for receipt of a succeeding charge.

When first started, the rich air-fuel mixture and the intake passageways through which the rich air-fuel mixture travels are cold. Fuel is thereby separated from the mixture and condenses onto the wall of the passageways. This loss of fuel from the mixture delivered to each auxiliary combustion chamber of the engine results in inefficient operation of the engine during the warmup period. The engine then emits unburned hydrocarbons under these conditions. This counteracts the normally clean burning features of this type of engine.

The present invention contemplates the use of an intake and exhaust manifold system which cooperates to quickly warm the rich air-fuel mixture to substantially reduce this cold start effect. The auxiliary intake manifold system is placed in thermal association with the exhaust manifold system to quickly heat the rich air fuel mixture. The manifold arrangement for the lean air-fuel mixture being less suseptible to such condensation effects is, in this embodiment, heated by the engine coolant to achieve maximum burn efficiency.

Accordingly, it is an object of the present invention to provide an inlet and exhaust manifold system for an internal combustion engine of the type employing an auxiliary combustion chamber associated with each main combustion chamber wherein the air-fuel mixture is rapidly heated during transmission to the auxiliary combustion chamber.

Another object of the present invention is to provide an intake and exhaust manifold system for delivering a rich air-fuel mixture and a lean air-fuel mixture to a combustion chamber system wherein the rich air-fuel mixture is rapidly heated by the exhaust and the lean air-fuel mixture is slowly heated by the coolant system of the engine.

Other and more detailed objects and advantages will appear hereinafter.

The drawing is a sectional view of an internal combustion engine and an intake and exhaust manifold system which illustrates a preferred embodiment of this invention.

Referring to the drawing, a cross-section of one combustion chamber arrangement of the present invention is illustrated. As any number of combustion chamber systems may be employed without varying from the inventive concepts and apparatus associated with each such chamber, only one chamber is illustrated. It is to be understood that more than one such chamber arrangement may be employed with the present manifold system. Each such arrangement includes a piston 1 conventionally positioned within a cylinder located in the engine block 12. A main combustion chamber 2 is provided above the piston 1 and is in immediate association therewith. An auxiliary combustion chamber 5 is provided which is displaced from the main combustion chamber 2. The auxiliary combustion chamber 5 is in communication with the main combustion chamber 2 through a passageway or torch nozzle 3.

Respiration of the engine is provided by three valved ports. A lean air-fuel mixture is intermittently provided to the main combustion chamber 2 through a main intake passage 6. Communication between the main intake passage 6 and the main combustion chamber 2 is controlled by a main intake valve (not shown). A rich air-fuel mixture is provided to the auxiliary combustion chamber 5 through an auxiliary intake passage 7. A small auxiliary intake valve 10 controls the intake to the auxiliary combustion chamber 5. An exhaust valve 11 controls the discharging of the combusted gases from the main combustion chamber 2 into exhaust passageway 8.

A spark plug 4 is positioned in the auxiliary combustion chamber 5 and is employed to initiate combustion. The rich air-fuel mixture present in the auxiliary combustion chamber 5 is ignited by the spark plug 4. A flame is thereby generated which projects into the main combustion chamber 2 through the torch nozzle 3. The introduction of the rich flame through the torch nozzle 3 acts to bring about ignition and combustion of the lean mixture within the main chamber 2. This combustion sequence can be used to substantially improve the purity of the engine exhaust and to effect a corresponding reduction in the creation of air pollution.

Air is ingested into the intake passageways 6 and 7 through an air cleaner 13. The ingested air is then passed through one of two carburetion systems. A first carburetor 14 is provided for creating a lean air-fuel mixture for introduction into each main combustion chamber 2. A second carburetor 15 provides a rich air-fuel mixture for each auxiliary combustion chamber 5. An intake manifold 16 is associated with the lean carburetor 14 for communicating the resulting lean intake mixture from the carburetor 14 to the intake passageways 6. A second intake manifold 17 is provided for communicating the rich air-fuel mixture from the auxiliary carburetor 15 to each auxiliary combustion chamber 5. Combusted gases are exhausted through the exhaust manifold 18.

In engines of the present type, it is often desirable that the intake mixtures be heated to insure proper vaporization of the fuel. In the case of the intake system associated with the auxiliary combustion chamber 5, it is preferable that the rich intake mixture be heated as soon as possible when starting a cold engine. The cold air-fuel mixture passing through the cold manifold 17 and passageways 7 loses a significant portion of the fuel to condensation on the inner walls of the auxiliary manifold 17. This results in the receipt of an air-fuel mixture which is improper for efficient combustion in the auxiliary combustion chamber 5. In larger passageways such as in the main intake manifold 16, the mixture is less suseptible to such condensation. However, it is still advantageous for combustion that the fuel be substantially vaporized before combustion.

To provide rapid heating of the inlet passageway to each auxiliary combustion chamber 5, each passageway of the manifold 17 is placed in immediate association with a passageway of the exhaust manifold 18. A riser 21 laterally spaced from the engine head 9 is secured to the exhaust manifold 18 and supports the carburetors 14 and 15. Further, the intake passageways 7 through the engine head is also near the exhaust passageways 8. The intake manifold 17 may be either adjacent to or integral with the exhaust manifold 18. This juxtaposition of the auxiliary intake manifold 17 with the exhaust manifold 18 provides for substantial heat transfer therebetween. Consequently, as soon as the engine is started, the heated exhaust gases will operate to heat up the rich air-fuel mixture in the auxiliary intake manifold 17 to prevent condensation of fuel.

Because of the size of the main intake manifold 16, it is less susceptible to fuel condensation when the engine is cold. However, for maximum operating efficiency, it is advantageous to have the lean air-fuel mixture warmed to insure complete vaporization of the fuel. Consequently, the coolant associated with the engine is directed from passageway 19 to jacket 20 through a convenient passageway schematically illustrated as 22.

Thus, the auxiliary intake manifold 17 may be rapidly warmed by the exhaust manifold 18 in the present invention while the main intake manifold 16 is more moderately heated. Having fully described the preferred embodiment of the present invention, it is to be understood that the invention is not to be limited to the details herein set forth but is of the full scope of the appended claims.

What is claimed is:

1. An inlet and exhaust manifold device for an internal combustion engine of the type having an auxiliary combustion chamber associated with each main combustion chamber and connected by a torch nozzle, the improvement comprising, in combination: a main intake manifold in communication with the main combustion chamber, an auxiliary intake manifold in communication with the auxiliary combustion chamber, an exhaust manifold in communication with the main combustion chamber, a riser laterally spaced from the engine, a first carburetor supported by the riser for supplying a lean mixture to the main intake manifold, a second carburetor supported by the riser for supplying a rich mixture to the auxiliary intake manifold, means on the riser for placing the main intake manifold in thermal communication with the cooling system of the engine for heating the lean mixture to a minor extent, and a means for placing the auxiliary intake manifold in thermal communication with the exhaust manifold along the length thereof for heating the rich mixture to a greater extent.

2. The combination set forth in claim 1 wherein the auxiliary intake manifold is integral with said exhaust manifold.

* * * * *

UNITED STATES PATENT OFFICE
CERTIFICATE OF CORRECTION

Patent No. 3,832,984          Dated September 3, 1974

Inventor(s) Eiji Taguchi

It is certified that error appears in the above-identified patent and that said Letters Patent are hereby corrected as shown below:

Title Page, the name of the inventor is misspelled.

It should be EIJI TAGUCHI.

Col. 3, line 2, "suseptible" should be corrected to read "susceptible".

Signed and sealed this 3rd day of December 1974.

(SEAL)
Attest:

McCOY M. GIBSON JR.
Attesting Officer

C. MARSHALL DANN
Commissioner of Patents